United States Patent [19]
Lee

[11] Patent Number: 4,678,642
[45] Date of Patent: Jul. 7, 1987

[54] BALLISTIC SEPARATION OF PARTICLES IN A PROGRESSIVE FLOW REACTOR

[75] Inventor: Donald M. Lee, Huntington, W. Va.

[73] Assignee: Ashland Oil, Inc., Ashland, Ky.

[21] Appl. No.: 690,236

[22] Filed: Jan. 10, 1985

[51] Int. Cl.⁴ .............................................. F27B 15/08
[52] U.S. Cl. .................................... 422/144; 208/153; 208/161; 422/145; 422/147
[58] Field of Search ....................... 422/144, 145, 147; 55/261; 208/153, 161

[56] References Cited

U.S. PATENT DOCUMENTS

| | | | |
|---|---|---|---|
| 2,377,657 | 6/1945 | Watts | 208/161 |
| 4,313,910 | 2/1982 | Dries et al. | 422/147 |
| 4,390,503 | 6/1983 | Walters et al. | 422/147 |
| 4,394,349 | 7/1983 | Cartwell | 422/147 |

Primary Examiner—Barry S. Richman
Assistant Examiner—William R. Johnson
Attorney, Agent, or Firm—Richard C. Willson, Jr.; Stanley M. Welsh

[57] ABSTRACT

An apparatus for separating solid particulates from vapors comprising: a disengaging chamber, a progressive flow reactor, a means for effecting flow of a gas-solid stream, and a take-off conduit which further includes providing a hole through the progressive flow reactor to permit upstream of the take-off conduit a pathway for vapors from within the disengaging chamber to pass into the progressive flow reactor. Specific limitations as to the size of the opening through the progressive flow reactor in relationship to the effective diameter of the progressive flow reactor, and the opening of the take-off conduit are disclosed.

16 Claims, 8 Drawing Figures

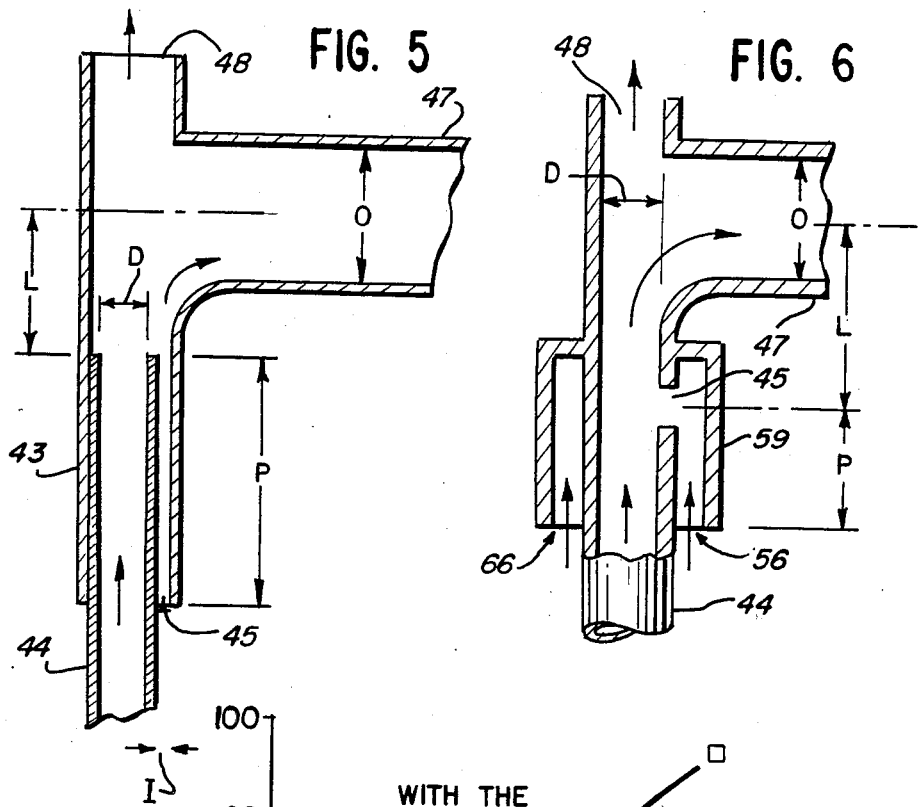
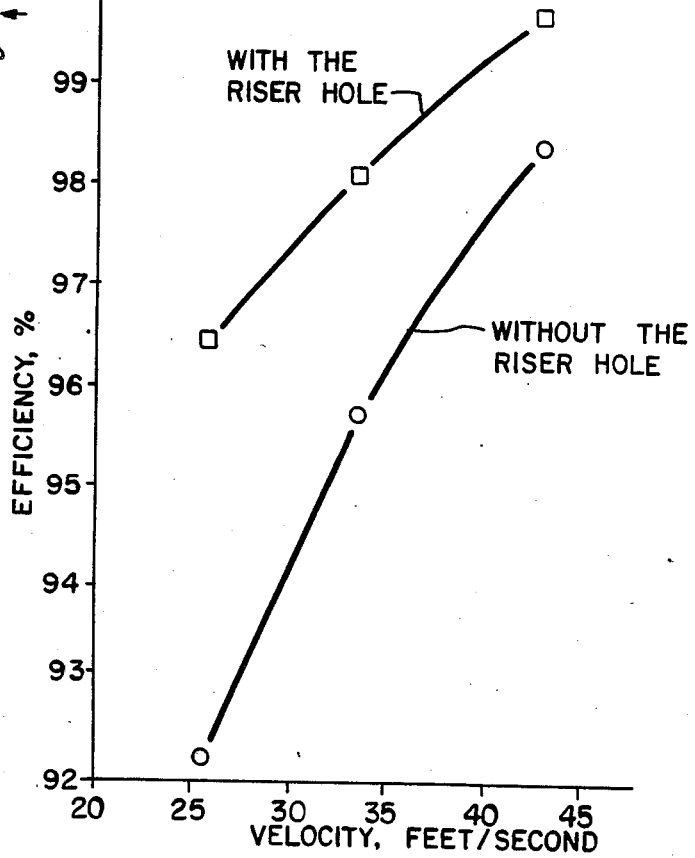

4,678,642

BALLISTIC SEPARATION OF PARTICLES IN A PROGRESSIVE FLOW REACTOR

BACKGROUND OF THE INVENTION (I) Field of the Invention

This invention relates to the separation of solids from vapor/solid mixtures. More particularly, this invention relates to ballistic separations of solids from mixtures of vapors and solid particles having particle size distributions in the range of about 0 to 200 microns.

(II) Prior Art

The two main methods of separating particulate matter from mixtures of vapors and particles are ballistic separations and cyclonic separations. Ballistic separation involves diverting from a mixture of particulates and vapors moving in a substantially straight line a stream of vapors at an angle transverse to the mixture. In the ballistic separation there is substantially no change in the relative velocity of the solids versus that velocity of the mixture of solids and vapors just prior to separation of a transverse stream consisting of a vapor containing far less particulates than was in the original mixture. Cyclonic separation, on the other hand, involves an acceleration, i.e., a change in velocity, of a mixture of solid particulates and vapors, wherein because of the difference in mass of the solid particulates versus the vapors there is a tendency to concentrate particulate components in one stream and to concentrate the vapors in a different stream both of which streams are being accelerated. One way to induce the acceleration of a mixture is to cause it to move along a wall which is curved. Typically cyclones have cyclonic retaining walls which cause mixtures of vapors and solids to move in a curved path.

In U.S. Pat. No. 1,600,762 (1926) of C. G. Hawley, there is disclosed an apparatus and process for separating carrier fluids from a mixture of the carrier fluid and entrained substances. The mixture referred to as a burdened carrier is accelerated in a container thereby causing the entrained material to be concentrated along a wall and then by force of gravity to be carried down into a lower portion of the container and the carrier portion is caused to double back on itself and through at least a portion of the accelerated burdened carrier out through an exit. This disclosed method in the terminology given herein before is employing a cyclonic type of separation. The centrifugal separation of the foreign substances is established by and within the vortex created by swirling the burdened carrier mass. Due to the differences in inertia between the entrained substances and the fluid carrier there is a separation or a concentration of the entrained material against the wall of the containing vessel. In the patent, the vessel is referred to as a shell or casing within which the acceleration is induced.

In U.S. Pat. No. 1,746,253 (1930) of C. G. Hawley, there is disclosed an improved apparatus and method for separating particulate matter or entrained substances from carrier fluids. In the apparatus and process, an incoming carrier stream is projected downwardly and at a point deflected laterally and thence downward and thence inward. Part of the stream consisting of the separated foreign substances by the force of gravity moves downward into an accumulation space within a separator and another part of the carrier stream having a reduced particulate component is caused to move against and deflect a portion of the burdened (particulate containing) stream. The burdened stream with particulate and fluid matter acts as a filter for the escaping stream consisting of primarily fluid matter. Also disclosed is a method of inducing the burdened carrier, i.e. the mixture of fluid and entrained substances, to move downward and in a helical path which causes the burdened fluid to accelerate against a deflecting path concentrating the particulate matter entrained within the fluid against the wall and inducing the fluid portion to move back upon itself and move against the cyclonic movement or helical movement of the burdened fluid through and then away from the burdened fluid. The method and apparatus disclosed in U.S. Pat. No. 1,746,253 is according to the definition herein above given a cyclonic separation, because the mixture of vapor and solids, i.e. the burdened fluid causes a change in velocity component of the mixture (both particulates and vapors) prior to separation.

In U.S. Pat. No. 4,066,533 of Myers et al, there is disclosed a method for disengaging catalyst particles from the effluent of a riser tube of a fluid catalytic cracking unit. The improved method for effecting the separation of catalyst particles from hydrocarbon conversion products involves actually discharging the bulk of the catalyst as a mixture of both catalyst and hydrocarbon conversion products in a substantially linear concurrent flow stream and then diverting laterally into a cyclonic separation system a stream consisting substantially of vapors only having a much lower concentration of particles contained therein than was present in the original axially flowing mixture of vapors and solids. The method for diverting laterally into a cyclonic separation system involves having a cyclonic separation system directly communicating with a conduit or tube such as used in a riser cracker. Examples of riser crackers can be found in U.S. Pat. No. 4,066,533. Transport velocities disclosed to occur in the operation of a typical fluid catalytic cracker are on the order of from 35 to 50 feet per second. The main criteria for transport velocities is that they be sufficient to impart a sufficient momentum to the solid particles within a mixture of solid particles in vapors flowing in a riser so that the solid particles will have a sufficient tendency to both stay in a straight line, and having left the riser will tend to ricochet from the walls of a retaining chamber away from the opening of the riser so as not to fall back into the riser. A deflector cone is disclosed to prevent particulates from either abraiding the upper end of a disengaging vessel or reentering the riser tube. A second deflector upstream of the radial takeoff point which leads to the cyclonic separation means is also separately disclosed. this second deflector extends angularly inward from the side of a riser wall just upstream of the side wall port leading to the cyclinic separation system. It has a tendency to deflect catalyst away from the port so as to increase the concentration of vapor versus particulate solids that would otherwise be drawn through the takeoff port into the cyclonic separation system.

In U.S. Pat. No. 4,070,159 (1978) of George D. Myers et al, there is disclosed an apparatus for the removal of solid particulates from gaseous mixtures of particulates and vapors. The apparatus broadly comprises a disengaging chamber, an elongated tubular conduit, a means for effecting the flow of a gas-solid stream; and a cyclone separator having a inlet laterally communicating with the elongated tubular conduit near the downstream end of the conduit. The downstream axial opening of the elongated tubular conduit is adapted to permit initial flow of the particulates into the disengaging chamber. Essentially, the apparatus is designed to carry out what has been defined to be a ballistic separation. Also disclosed in this patent is the use of a baffle or deflector means upstream of the opening in the elongated tubular conduit which is in direct communication with the cyclone separator means. Also disclosed is the possibility of having either a uniform diameter throughout the elongated tubular conduit or have a tapered section disposed at one end of the tubular conduit to increase the disengagement of the catalyst from the gas stream by accelerating linearly the mixture of gas and particulate matter. The separation carried out by the separator means results in a stream of vapors which are taken out of the disengaging chamber and the particulate matter returned to a lower portion of the disengaging chamber. The transport velocities in the elongated tubular conduit are disclosed to be in the range of from about 35 to 50 feet per second. The cracking catalyst applicable is usually in the size of from about 5 to 100 microns with a major portion, e.g. in excess of 50% by weight, thereof being in the range of from 40 to 80 microns. The specific transport velocity is selected so as to minimize slippage of the catalyst and yet provide sufficient residence time within the riser tube in order to realize the optimum degree of conversion of a particular hydrocarbon feedstock. Also, it was indicated that using various tapered elongated conduits permits a method for controlling residence time within the elongated tubular conduit.

U.S. Pat. No. 4,219,407 (1980) assigned to Mobil Oil Corporation discloses a riser cracking operation wherein an improved method for separating vapors from entrained catalyst solids is employed. A mixture of vapors and particulates which have been induced to exit from a riser reactor zone are induced to flow outwardly then downwardly. A curved surface causes the particulates of an effluent from the riser to concentrate along this surface. The process is very similar to that disclosed in U.S. Pat. No. 4,313,910.

In U.S. Pat. No. 4,295,961 (1981) of Fahrig et al, there is disclosed a method and apparatus for fluid catalytic cracking wherein a direction of a mixture of fluid and particulate matter is induced to travel in a downward direction after exiting from a riser reactor. The mixture moving in a downward path has a ballistic separation performed on the downwardly flowing mixture of particles and vapor. The particles and vapor have been in part concentrated through a cyclonic induced separation wherein some of the particles have been induced to move in a curved path which likely causes some of the particulate components to concentrate along the wall defining the curved path.

In U.S. Pat. No. 4,310,489 (1982) of Fahrig et al, there is disclosed a separation of a fluid stream comprising a mixture of particulates and vapors which involves both a ballistic and cyclonic separation. From a riser cracker, a mixture comprising particulates and vapors reverses direction and flows downwardly prior to transverse movement of vapors away from particulates into a cyclone.

In U.S. Pat. No. 4,313,910 (1980) of Dries et al, there is disclosed an apparatus for separating a carrier gas from a particle/carrier gas stream. It is particularly adaptable to reactor-risers commonly used in catalytic cracking of hydrocarbon feedstocks. The separation is basically a cyclonic separation wherein a mixture of a carrier gas and particulate matter are accelerated along a curved surface so as to induce the particles to concentrate along the curved surface. Additionally, there is added a substitute fluid through one or more apertures in the curved surface in order to substantially replace the carrier gas remaining in the spaces between the particles. As is clear from catalytic cracking of hydrocarbons, the carrier fluid consists of cracked products and the substitute fluid, of uncracked hydrocarbons. A cleaner separation of catalyst particles from the carrier stream is asserted. The exiting particulate stream relative to its incoming stream from the riser cracker for example can be any where from 90 degrees to about 180 degrees. The fluid stream is moved laterally relative to the mixture of the particulate and carrier streams. The separation disclosed in U.S. Pat. No. 4,313,910 is clearly cyclonic.

U.S. Pat. No. 4,318,800 (1982) assigned to Stone and Webster Engineering Corporation discloses an improved thermal regenerative cracking apparatus and process. Separator efficiency was improved by causing vapor components to move in a flow path involving a 180 degree turn. Further it was disclosed that the flow path must be essentially rectangular and the relationship between barrier height and the sharpness of the U-bend in the gas flow was very significant.

In U.S. Pat. No. 4,341,624 (1982) of George D. Myers, there is disclosed the use of a ballistic separation in a reduced crude conversion process. The importance of this disclosure was that use of ballistic separation in a riser similar to a riser conventionally used in a fluid catalytic cracking system could be carried out in the context of the types of hydrocarbons catalysts and superficial velocities of vapors and solid mixtures in such an elongated conduit. Carbo-metallic feeds employed in the invention involve a 343° C. (650° F.) plus material containing at least 4 parts per million of nickel equivalents as defined in its specification.

In U.S. Pat. No. 4,390,503 (1983) of P. W. Walters et al, there is disclosed a ballistic separation device and method where the flow path of a mixture of particulate matter and vapors are separated into a stream of particulate matter and a stream of substantially only vapor components. It is primarily a ballistic separation because the particulate matter entrained within the mixture of particulate matter and vapor does not change speed or velocity relative to the mixture prior to having vapor components laterally drawn off from the mixture. Also disclosed is a target against which the mixture can impinge. The target causes some cyclonic motion which occurs substantially after vapor components have been separated. Vapor components are initially separated from the mixture of particulate and vapor components prior to contact of the target by the particulate components. The path of the vapors in U.S. Pat. No. 4,390,503 usually involves at least one 180 degree turn after exiting from a conduit and before entering into a cyclone or cyclonic separation system. This is primarily a ballistic separation with a minor amount of cyclonic separation.

U.S. Pat. No. 4,394,349 (1983) assigned to Standard Oil Company (Indiana) disclosed an apparatus for fluidized catalytic cracking of a hydrocarbon feedstock. The apparatus involves a riser reactor and a collar positioned about the axis defined by the downstream end of the reactor. The collar is positioned in close proximity to, but not in contact with, the riser reactor so that an annular space is defined between the riser reactor and the collar. The collar has a diameter greater than the diameter of the riser, but is spaced away from the riser so as not to be in contact with the riser in order to avoid expansion problems. Two significant differences between the riser disclosed in U.S. Pat. No. 4,394,349 and the instant invention are:

1. the relationship between a coanda influenced vapor stream entering through passageway 45 and the vapor/particulate stream flowing through riser 44 (see FIGS. 2–6); and 2. the influence of the pressure drop across a cyclone upon vapor components from within the riser 44 to cyclone separation means 46. These differences will be discussed in more detail later in this specification when specific embodiments of the instant invention are discussed.

U.S. Pat. No. 4,477,335 (1984) of Roger M. Benslay assigned to Ashland Oil, Inc., discloses a method and apparatus for two stage regeneration in which a downcomer within a regenerator vessel causes downward transfer from an upper section to a lower section. As catalyst is transferred from the upper section to the lower sections a ballistic type separation is carried out.

Great Britain Ser. No. 816,550 (1958) discloses apparatus for separation of solid particulates from a gas stream in which they are entrained. A ballistic type separation is disclosed wherein vapors are drawn off from a chamber which surrounds at least a portion of a conduit which is similar to appearance to a riser.

It is an object of this invention to provide improved separation by way of ballistic separation which involves use of a progressive flow reactor.

Other objects of this invention will be clear based upon the disclosure made herein.

BRIEF DESCRIPTION OF THE INVENTION

Broadly, this invention involves improving separation achievable by means of a ballistic separation from a progressive flow reactor having a vapor takeoff conduit or inlet conduit which provides fluid communication between the interior of said progressive flow reactor and a cyclone separation means. Improved separation has been found to occur when a vapor pathway is provided through the wall of the progressive flow reactor which permits flow from a dilute phase in a disengagement vessel to the interior of the progressive flow reactor.

Of importance to the operation of the invention is that the area of the inlet conduit or vapor takeoff conduit to the area of the vapor pathway is in a ratio in the range of about 4:1 to about 8:1, and preferably about 5:1 to about 7:1 and still more preferably about 5.5:1 to about 6.5:1. The vapor pathway is preferably upstream of the inlet conduit or the takeoff conduit which leads to a cyclone separation means.

Ideally, the distance upstream of the vapor pathway from the entrance to the vapor take-off conduit or inlet conduit is in the range of $\frac{3}{4}$ to 3 equivalent diameters of the vapor take-off conduit. By "equivalent diameter" is meant the diameter that a cylindrical conduit would have which has substantially the same area at right angles to the direction of flow therein.

In still another embodiment of the instant invention, an additional improvement in separation is possible by providing an enclosed pathway through which vapor from the dilute phase within a disengagement chamber must pass prior to entering the progressive flow reactor through the vapor pathway resulting from a hole through a wall of the progressive flow reactor. The length and preferably the height of the enclosed path is so designed that there is some fractionation of the particles entrained in the vapor entering from the dilute phase so that by the time the vapor enters the pathway into the progressive flow reactor, there is a reduction in the particulates contained therein. There is a point of diminishing returns however. If the length and more preferably height of the enclosed path extends to a distance near the dense phase bed at the bottom of the disengagement chamber or to more densely populated concentrations of particulates entrained in a dilute phase not much above the dense phase, then the concentration of particulates entrained in the vapor entering the enclosed pathway will not be lessened by fractionation sufficiently to provide an improved reduction in amount of particulates entering the progressive flow reactor through the vapor passageway. In general, the height of the enclosed pathway is in the range of about $\frac{3}{4}$ to 3 equivalent diameters of the vapor take off conduit which leads to a cyclone separation means.

In still another embodiment of the instant invention, the enclosed pathway disclosed hereinabove can result from enclosing or partially enclosing the progressive flow reactor with a second conduit or partially including conduit wall.

In still another embodiment of the instant invention, the ratio of the area within takeoff conduit or inlet conduit to the cyclone separation means measured within such conduit at right angles to the direction of flow of vapor therethrough to that area at right angles of flow therein of the progressive flow reactor is preferably in the range of about $\frac{1}{2}$:1 to about 1.5:1.

The dimensions and relationships discussed above are discussed in more detail later.

BRIEF DESCRIPTION OF THE FIGURES

FIGS. 3–6 disclose a variety of embodiments of this invention wherein a vapor pathway through a riser is provided to improve vapor particulate separation in a ballistic type separation.

FIG. 8 is a graph relating percent efficiency of separation as a function of velocity in feet per second through the riser.

DETAILED DESCRIPTION OF THE INVENTION

Broadly this invention is an improvement to the apparatus disclosed by George D. Myers et al in U.S. Pat. No. 4,070,159 (1978). In an apparatus comprising a disengaging chamber, an elongated tubular conduit, means for effecting the flow of a gas-solids stream, and a cyclone separator having an inlet laterally communicating with the elongated tubular conduit near the downstream end of that conduit so as to permit a fluid communication there between, an improved separation of solid particulates from gaseous mixtures of particulates and vapors can be achieved by appropriate dimensioning and locating a vapor pathway through a wall of the elongated tubular conduit.

Figure 1:
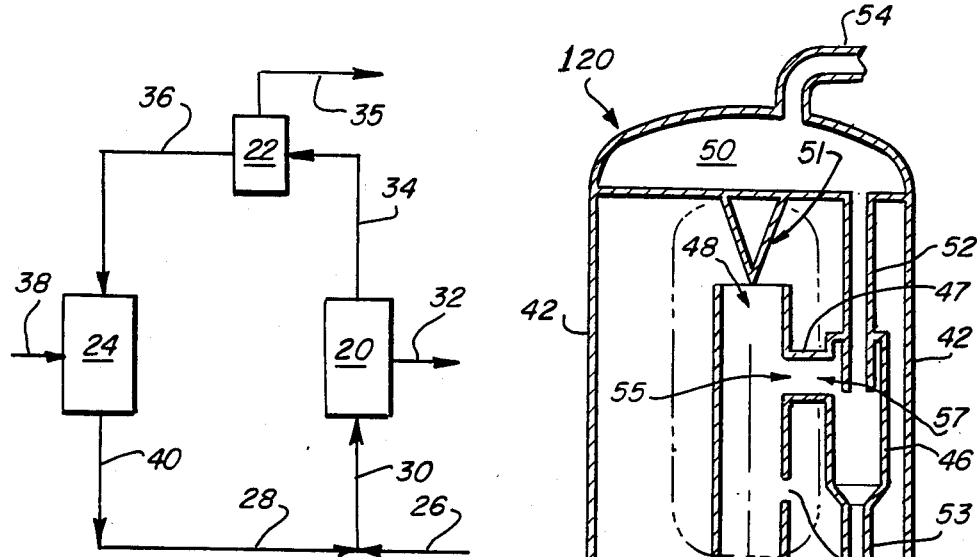
FIG. 1 is a schematic view of an interconnected regenerator and reactor.

In FIG. 1 there is a reactor 20, a separation means 22, a regenerator 24 and the following conduits, 26, 28, 30,

32, 34, 35, 36, 38 and 40. FIG. 1 discloses schematically a reactor for hydrocarbon conversion, and a regenerator. This figure is provided to permit an overview of one example in which the improved ballistic separation of the instant invention can be used.

Briefly, the operation disclosed in FIG. 1 is as follows. A hydrocarbon feed stock is introduced into conduit 30 from conduit 26 with regenerated or fresh catalysts from conduit 28. Exiting from riser 20 are hydrocarbon products with some entrained particulates through conduit 34 for further processing. Conduit 34 corresponds to conduit 47 of FIG. 2. Exiting through conduit 32 are particulates which collect at the bottom of the disengagement chamber shown as vessel 42 in FIG. 2.

Also exiting from riser 20 through conduit 34 are vapors and particulates (catalyst particulates or sorbent particulates) which enter separation means or cyclone 22. Schematic box 22 corresponds to cyclone separator 46 of FIG. 2. Exiting from separation means or cyclone 22 are vaporous components through conduit 35 which corresponds to conduit 52 of FIG. 2. Also exiting from separator means 22 through conduit 36 are particulates. Spent particulates are carried through conduit 36 into regenerator 24. Riser reactor 20 corresponds to riser 44.

Examples of regenerators that may be employed in this process can be found in U.S. Pat. Nos.: 4,417,975 (1983); 4,405,445 (1983); 4,434,044 (1984); and 4,341,624 (1982).

Oxidizing vapors, such as air with or without steam, enter regenerator 24 through conduit 38. Exiting from regenerator 24 through conduit 40 are regenerated catalysts or sorbents which are then returned to reactor 20 either alone or with additional catalysts or sorbents through conduit 28.

Figure 2:
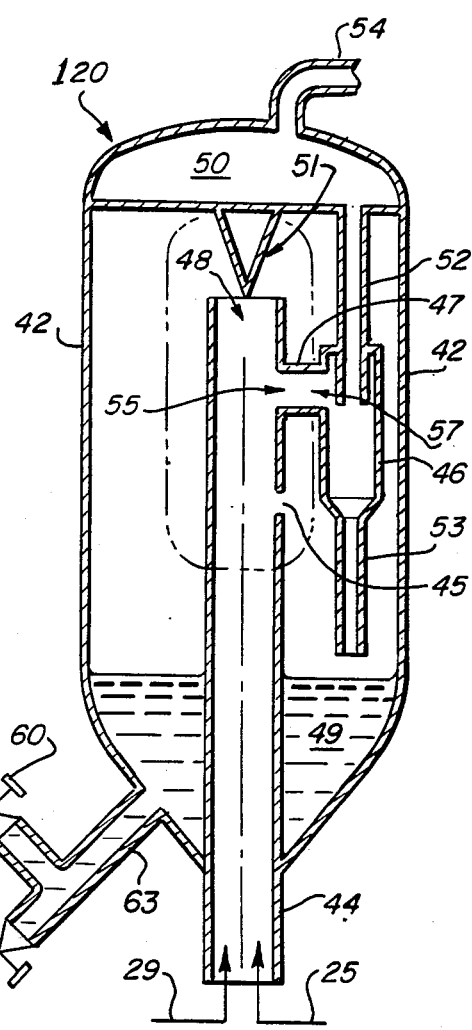
FIG. 2 is a more detailed view of a reactor conventionally used to carry out hydrocarbon conversion processing, e.g. cracking.

In FIG. 2, there is a more detailed example of a progressive flow reactor which can be used in the schematic arrangement disclosed in FIG. 1.

Reactor 120 of FIG. 2 contains riser reactor 44, separation means 46, a disengagement vessel or chamber 42, and a series of conduits 25, 29, 47, 52, 54, and 55, and valves 60 and 62. Riser 44 is in fluid communication to the interior of separator 46 through conduit 47. Optionally, above the axial opening 48 of riser 44, there may be a target or deflector cone 51. Also in disengagement vessel 42, there is a plenum chamber 50 into which vapor components separated by the one or more separation means or cyclones 46 are removed. In FIG. 2, there is only one separation means disclosed, but as is clear to one of skill in the art, more than one separation means can be utilized. Further, more than one separation means can be in series before transfer of vapor components to plenum 50. In FIG. 2, only a primary stage cyclone is disclosed, but secondary and even tertiary cyclones are possible.

Briefly, the operation of the apparatus disclosed in the FIG. 2 is as follows:

Particulates such as sorbents or catalysts enter through conduit 29 into riser 44 either alone or mixed with a lift gas or with a hydrocarbon feed. In FIG. 2 the hydrocarbon feed is disclosed to enter through conduit 25. Hydrocarbon vapors and catalyst particulates progressively flow through riser 44 at a rate in the range of about 20 to about 50 feet per second and more preferably about 25 to about 40 feet per second. Due to the differential pressure to be discussed in more detail later, vapor components enter from a dilute phase in disengagement vessel 42 through a fluid passageway or pathway 45. Vapor from fluid passageway 45 and a mixture of vapor and particulates which were introduced upstream of pathway 45 move through reactor 44. The particulates of this mixture substantially only exit axially through axial opening 48 and the vapor components, exit through conduit 47 into cyclone separator 46. There is a pressure differential between entrance to conduit 47 and the exit in conduit 52 within cyclone or separation means 46. This differential in pressure is in the range of about a quarter of a pound to five pounds per square inch and more preferably a half of a pound to about two pounds per square inch.

As the mixture of vapor and particulate components moves through progressive flow reactor 44, vapor components are drawn in through opening 45. Because of the difference in pressure in reactor 44 and within separation means 46, and because of the difference in inertia between particulate and vapor components, primarily only vapor components are induced to enter conduit 47. Percent efficiency of separation of particulates from vapor components is discussed by way of an example in FIG. 8. The material which flows past opening 55 toward axial opening 48 has a substantially increased percentage of particulates over vapor components. Material exiting from axial opening 48 are optionally deflected by deflector cone 51 to move in a somewhat horizontal path toward the outer walls of disengagement chamber 42. These particulate components then fall into a dense fluid bed 49 of spent catalyst. Vapor components having a substantially reduced particulate content enter through conduit 47 into the interior of cyclone 46. Vapor components exit through conduit 52 to plenum chamber 50 then through conduit 54 for further processing in apparatus not shown. Particulate components exit 46 through dipleg 53 and enter dense bed 49. Dipleg 53 may be within dense bed 49.

Material is moved from dense bed 49 through conduit 55 passed valve 62 into a regenerator not shown. Additional catalysts makeup or additional sorbent makeup may be introduced into conduit 55 through valve 60. Also there is a steam stripping zone not shown which removes volatilizable hydrocarbon components from contaminated catalysts prior to regeneration. The hydrocarbons stripped and the vapors used to carry out the stripping enter through dense phase bed 49 into disengagement vessel 42. As much as 10% by volume, based on volume of vapor particulates entering vessel 42 from riser 44, in the form of vapors, enters as a result of such stripping. All such vaporous material must be removed through cyclone 46.

Figure 3:
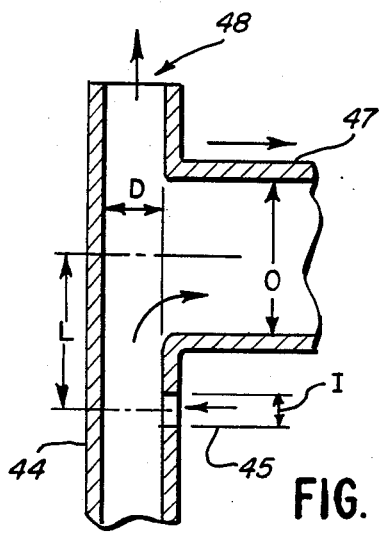

FIG. 3 shows an enlarged view of the embodiment disclosed in FIG. 2. The numbering for each is the same. Several dimensions are referred to in FIGS. 3–6, which are: "O", "L", "I", "D" and (in FIGS. 5 and 6) "P". Where the letters are the same in each of these figures they are defined in the same way as follows: "O" is the diameter of a cylindrical conduit which would have substantially the same area at right angles to direction of flow therein as conduit 47 ("the equivalent diameter"); "D" is the equivalent diameter of a cylindrical conduit which would have substantially the same area at right angles to direction of flow therein as conduit 44 in the vicinity of the opening to conduit 47 based upon an extrapolation of conduit 44; "L" is the distance from center of opening of vapor pathway 45 to center of opening of conduit 47; "I" is the area at right angles to direction of flow in pathway 45 immediately prior to entrance into progressive flow reactor 44; and "P" is the distance of overlap between conduit 43 and conduit 44 shown in FIG. 5. In FIG. 6, there is a similar overlap "P" which gives the distance from the entrance opening to pathway 56 to the entrance opening of pathway 45. The additional overlap beyond entrance to pathway 45 shown in FIG. 6 does not enter into the determination of distance "P". As discussed in more detail in other portions of this specification and the claims, these dimensions have a unique relationship in the context of the instant invention. For example, the ratio of the area at right angles to flow of conduit 47 to that of pathway 45, "I", is in the range of about 4:1 to about 8:1, preferably about 5:1 to about 7:1 and most preferably about 5.5:1 to 6.5:1. also by way of still another example, the distance "P" to the length "O" is in the range of about ¾:1 to about 3:1 and the distance "L" to the length "O" is in the range of about ¾:1 to about 3:1.

Figure 4:
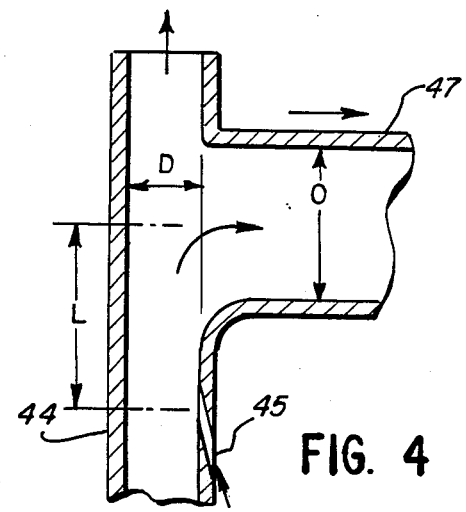

FIG. 4 shows an alternative embodiment of the riser disclosed in FIGS. 2 and 3. Vapor path 45 is disclosed to be at an angle with respect to the interior of riser 44. The angle of vapor path 45 can be anywhere from 90 degrees to close to 180 degrees However, preferably the angle of vapor input is in the range of about 100 degrees to about 150 degrees.

In FIG. 5, a vapor passageway 45 arises by a partial overlap of more than one conduit. In more detail the arrangements of the dual conduits are as follows:

Conduit 43 with take off conduit 47 to a cyclone not shown overlaps riser 44 for a length equal to "P". The difference in diameter size of conduit 43 and conduit 44 gives rise to a space or passageway 45 between conduits. The overlap may or may not be concentric. In FIG. 5, it is not. Conduit 43 is, for example, attached along one side of overlap between riser 44 and conduit 43. Preferably, vapor entering passageway 45 under the influence of either the reduced pressure created by a cyclone (not shown) or the flow of vapor/particulates moving through conduit 44 into conduit 43 moves smoothly along the interior wall of conduit 43 under the influence of the "coanda" effect, and provides a barrier or filtering zone which tends to reduce the number of particulate materials being carried over into conduit 47. Of particular importance in the instant invention is the smooth transition between those vapors under the influence of the coanda effect and that fluid consisting of vapor/particulates introduced into conduit 44 upstream of passageway 45. The distance "P" is equal to the length of passageway 45 running from the entrance thereof to the exit within interior of conduit 43. "I" is the area at right angles to direction of flow between the exterior surface of conduit or riser 44 and the interior surface of conduit 43. The distance "D" is the diameter of riser 44 in the vicinity of opening to conduit 47 based upon an extrapolation thereof. The distance "L" is the distance from the middle of the exit of passageway 45 to the middle of the entrance to conduit 47. Conduit 47 has an equivalent diameter equal to "O".

These distances are interrelated as follows: "I" has an area in the range of ⅛ to ½ of the area of a circle with a diameter of "O". The distance "L" is preferably not less than about ¾ "O" nor much more than about 3 "O". The distance "P" is such a length so as to minimize the amount of particulates entrained in any vapor entering the entrance to vapor passage 45 from being carried into conduit 47 to a cyclone (not shown). As the distance "D" increases, there is a certain amount of fractionation of vapor/solids so that vapor entering passageway 45 ultimately has fewer particles than would otherwise be the case upon entrance to conduit 47 had the length of "P" been shorter. However, as the length of "P" becomes still longer, it can conceivably enter the dense phase bed 49 in the disengagement chamber 42. This would then be counter-productive. Also, as one approaches the dense phase, the concentration of entrained particulates tends to increase so that the vapor/particulates stream that would enter passageway 45 in essence contains more particulates as the length "P" becomes much more than three "O".

The distance "O" with respect to the distance "D" is determined by the ratio of the area at right angles to the direction of flow within take off conduit 47 to the area at right angles to the direction of flow within riser 44 so that ratio of areas is in the range of about ½:1 to about 1.5:1.

In FIG. 6, inverted cup 59 is disclosed. Inverted cup 59 creates a vapor passageway which surrounds at least a portion of conduit 44. Vapor enters opening 56 which is a passageway which on one side has the exterior surface of conduit 44 and the interior surfaces of inverted cup 59. The purpose of having an elongated pathway through which vapor must flow prior to entering riser 44 through vapor passageway 45 is to lessen the amount of entrained particles that may be contained within the vapor. Preferably, the length "P" of passageway 56 for vapor to the entrance of passageway 45 is in the range of about one to ¾ of equivalent diameters of the vapor take-off conduit 47, with "O" as shown in FIG. 6.

Figure 7:
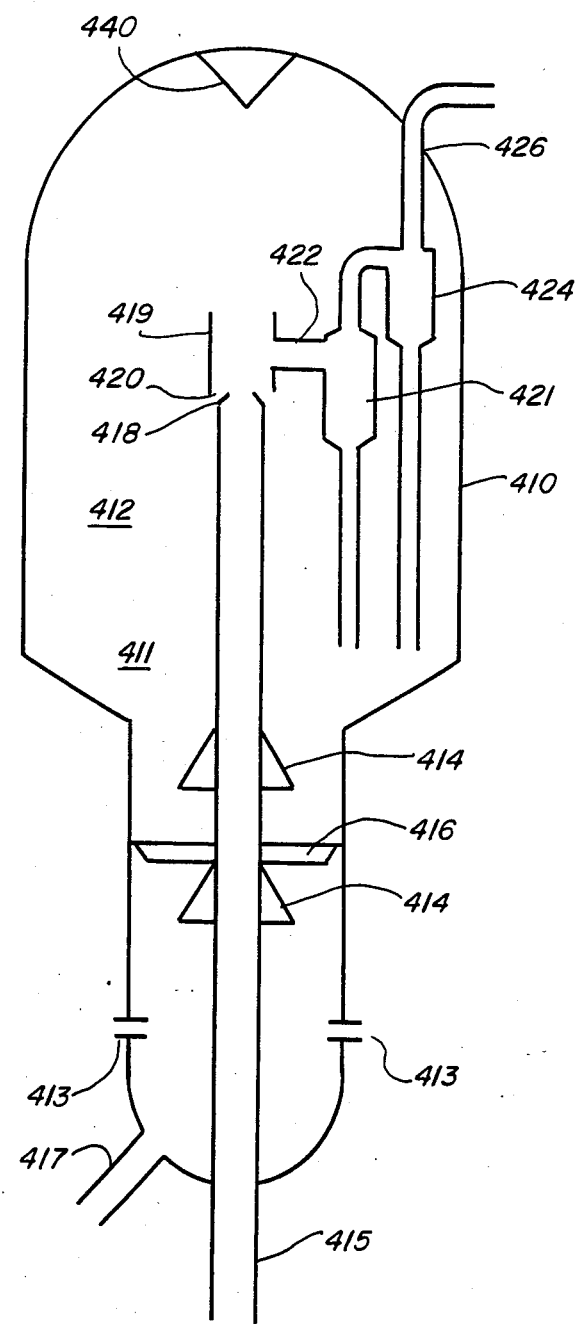
FIG. 7 is an example of prior art.

Referring to FIG. 7 disclosing prior art of Cartmell, U.S. Pat. No. 4,394,349 (1983), there is disclosed a disengagement vessel 410 within which there is a riser 415, cyclones 421 and 424 dilute phase 412 and a dense phase 411, stripping conduits 413, vanes 414 and 416 within dense phase 411, conduit 417 for removal of stripped and carbonaceous coated catalysts, a collar 419 in fluid communication to cyclone 421 by means of conduit 422, a taper 418, and a deflection plate 420.

Briefly, the embodiment disclosed in FIG. 7 operates as follows. Particulates in vapors are caused to be moved through riser 415 then induced to move inwardly by taper 418. Substantially all of the material exiting the downstream end of riser 415 passes into collar 419. The vapor components are induced to move into conduit 422 then into primary cyclone 421 and from primary cyclone 421 into secondary stage cyclone 424. The vapor components are withdrawn through conduit 426 and particulate components exit cyclones 421 and 424 through diplegs into dense phase bed 411. There is some overlap between collar 419 and conduit 415. The angular space between collar 419 and riser 415 including taper 418 is very narrow relative to the diameter of riser 415.

Optionally, there may be a deflection plate 420 to induce flow outwardly towards the exterior walls of disengagement vessel 410 after impact by particulates exiting from collar 419.

After the spent catalyst has entered dense phase bed 411 it is under the influence of paddles 414 and 416 stripped of vaporous hydrocarbons by means of a stripping medium that enters conduit 413. The stripped catalyst then is removed from dense phase bed 411 by means of conduit 417 for return to a regenerator (not shown).

In contrast to the functioning of the instant invention as compared to the embodiments disclosed in U.S. Pat. No. 4,394,349 of Cartmell and shown in FIG. 7 is a smooth flow path that is available for vapor and particulates as they move through riser 44. This is to be distinguished from Cartmell which shows a transfer from one diametered conduit to another with a gap there between and projection or taper 418.

Because smooth flow is encouraged along the wall just prior to the takeoff point at conduit 47, the stream of the instant invention flows a "coanda effect" path. The transition from the coanda stream to the vapor/solids stream moving through the riser causes a decrease in the quantity of particulates entering conduit 47 leading to a cyclone (not shown). Also the more confined area in the instant invention as compared to that disclosed permits a stronger drawing force being induced upon the vapor components as compared to what would otherwise be the case in the embodiment disclosed by Cartmell. Cartmell also does not seem to appreciate the significance of the relative diameter and locations of various possible additional stream components that may arise during operation. For example, there is no suggestion as to the impact of flow, if any, through gap 420.

In FIG. 8, test results of the embodiment of FIGS. 2 and 3 is discussed. An experimental apparatus used consisted of ⅝ inch clear plastic tubing, 20 feet in length, representing a riser, a disengagement chamber/stripper of clear plastic 6 inches in diameter and 24 inches long over the downstream end of the riser, leaving a clearance of 4 inches between the axial opening of the riser and the top of the disengagement vessel. The apparatus was operated at room temperature under vacuum. Room air entered the unit at the bottom of the riser through regulating valves and was discharged from the disengaging chamber and regulator, respectively. All vaporous effluents were metered and exited through a vacuum pump. Room air also entered the unit in other locations such as a stripper zone to simulate steam stripping in a commercial unit. The riser diameter of the test unit was ⅝ inches with other dimensions scaled appropriately.

A test is conducted by passing a specific amount of fluidized solid up the riser over a specified time with a specific riser gas velocity. Solids lost from the disengaging chamber were recovered in an external cyclone with a sealed dipleg. Separation efficiency is determined as:

100% (1—-loss)/load=percent efficiency

Where:
Loss=solids collected in the external cyclone dipleg.
Load=amount of catalyst passed up the riser.

Two tests were run, one with a hole through the riser and another without. Additional improvements are to be found over the results shown in FIG. 8 using the embodiments of FIGS. 5 and 6.

Of importance in optimizing efficiency, the size and location of vapor passageway 45 is very important. The ratio of the area of conduit 47 at right angles of the direction of flow to cyclone (not shown) to that area of vapor passageway 45 into riser 44 is in the range of about 4:1 to about 8:1 and preferably in the range of about 5:1 to about 7:1 and still more preferably about 5.5:1 to about 6.5:1.

Particulate size of catalyst or sorbents that may be separated from vapors by the instant invention are preferably in the range of about 40 to about 120 microns. Of course, the larger the catalyst or sorbents in particulate size, the more efficient the separation achieved in the ballistic type separation process exemplified by the instant invention. Regenerator 24 is usually at a temperature in the range of about 649° C. to 871° C. (1,200° to 1,600° F.), however higher temperatures are possible. The particle size distribution of the materials used in the experimental test apparatus was:

| Particle Size Distribution | | | |
|---|---|---|---|
| Fresh | | After Use | |
| Microns | Accumulation % | Microns | Accumulation |
| 0–20 | 2 | | |
| 0–30 | 7 | | |
| 0–40 | 16 | 0–40 | 1 |
| 0–60 | 42 | 0–60 | 19 |
| 0–80 | 68 | 0–80 | 52 |
| 0–105 | 86 | 0–105 | 77 |
| 0–149 | 96 | 0–149 | 92 |
| 0–149+ | 100 | 0–149+ | 100 |

Specific methods or embodiments discussed in this specification are intended to be only illustrative of the invention disclosed. Variations on methods, embodiments or combinations of features from various embodiments are readily apparent to a person of skill in the art based upon the teaching of this specification and are therefore intended to be included as part of the invention disclosed herein. For example inverted cup 59 may be used not only with a vapor path 45 which is at an angle, (shown in FIGS. 4 and 6) but also may be used with the embodiment disclosed in FIGS. 2 and 3. Also, for example, conduits may be other than cylindrical, e.g. square or rectangular.

Examples of other processes and methods with which the instant invention can be used beyond those specifically discussed in the instant specification are given briefly hereinafter. These processes are: separation of fluid-bed reforming catalyst particles containing precious metal or non-precious metal oxides; separation of ash from gaseous products and coal liquefaction and gasification; separation of coke fines from vaporous products in Flexicoking processes such as licenses by Exxon Research and Engineering Company; separation of fluid bed catalyst from vaporous products which arise during the preparation of acrylonitriles in processes such as developed by Sohio; separation of fluidized bed particles from reaction products of oxidation, polymerization, alkylation, or ammidoxidation; separation of saw dust from air arising during wood pulp processing; and separation of fluid catalytic cracking catalysts or sorbents from hydrocarbon products such as in the processes licensed by Gulf Research and Development Company, UOP, Inc. or M. W. Kellogg Company.

Any reference to patents made in the specifications is intended to result in such patents being expressly incorporated herein by reference including any patents or other literature references cited within such patent.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein.

Reference to patents made in the Specification is intended to result in such patents being expressly incorporated herein by reference including any patents or other literature references cited within such patents.

The invention which is claimed is:

1. In an apparatus for the separation of solid particulates suspended in a gaseous medium which comprises: a disengaging chamber serving as a reservoir for the collected solid particulates; a progressive flow reactor having means defining an upstream end and means defining a downstream end which further includes an axial opening wherein at least a portion of said reactor including said downstream end is enclosed within said disengaging chamber; means for effecting the flow of a gas-solid stream from the upstream end of said reactor towards said downstream end; and a take-off conduit in fluid communication with said reactor located at a position proximate said axial opening and which is connectable to a cyclone separator means, wherein the improvement comprises: providing means defining a vapor pathway within said portion of said flow reactor through which vapors in a dilute phase within said disengaging chamber are induced to enter said reactor because of a differential in pressure between said reactor and said disengaging chamber, wherein the ratio of the cross-sectional flow area of said pathway to the cross-sectional flow area of said take-off conduit is in the range of about 1:4 to about 1:8.

2. The improved apparatus of claim 1, wherein said ratio of the cross-sectional flow area of said take-off conduit to cross-sectional flow area of said pathway is in the range of about 5:1 to about 7:1.

3. The improved apparatus of claim 1, wherein said vapor pathway is at an angle with respect to the longitudinal axis of said progressive flow reactor in the range of about 90 degrees to 180 degrees.

4. The improved apparatus of claim 1, wherein said vapor pathway is upstream of and spaced from said take-off conduit.

5. The improved apparatus of claim 4, wherein the spacing distance between said vapor pathway and said take-off conduit is in the range of about ¼ to about 3 times the equivalent diameter of said take-off conduit, wherein the equivalent diameter of said take-off conduit is the diameter of a cylindrical conduit having the same cross-sectional flow area as that of said take-off conduit.

6. The improved apparatus of claim 5, wherein said vapor pathway is at an angle with respect to the longitudinal axis of said progressive flow reactor in the range of about 90 degrees to 180 degrees.

7. The improved apparatus of claim 1, wherein there is provided means defining an enclosed path which connects said vapor pathway in fluid communication with said disengaging chamber and thereby lessons the amount of entrained particulates from passing from said disengaging chamber into said reactor,
 by restricting flow of vapor from within said disengaging chamber through said vapor pathway into said reactor.

8. The improved apparatus of claim 7, wherein the length of said enclosed path is in the range of about ¼ to about 3 equivalent diameters of said take-off conduit.

9. The improved apparatus of claim 7, wherein said enclosed path is defined by exterior surfaces of said progressive flow reactor and by interior surfaces of a conduit closed at one end and open at the other end and which at least partially surrounds said downstream end of said progressive flow reactor, wherein the length of said conduit from its end and to said vapor pathway is in the range of about ¼ to about 3 times the equivalent diameters of said take-off conduit.

10. The improved apparatus of claim 9, wherein said conduit completely surrounds said downstream end of said progressive flow reactor.

11. The improved apparatus of claim 10, wherein the length in direction of flow within an annular space resulting from the spatial interrelationship of said overlapping conduit of larger diameter and said reactor is in the range of about ¼ to about 3 times the equivalent diameter of said take-off conduit.

12. The improved apparatus of claim 10, wherein the ratio of the cross-sectional flow area of said takeoff conduit to the cross-sectional flow area of said progressive flow reactor in the vicinity of said takeoff conduit is in the range of about ½:1 to about 1.5:1.

13. An apparatus for the separation of solid particles suspended in the gaseous medium which comprises in combination: a progressive flow reactor having means defining a downstream section having an axial opening therein; a partially overlapping conduit having means defining an open upstream section of larger diameter then said reactor, means defining an open downstream section, and a vapor takeoff conduit between said upstream and downstream sections adapted for connection to a separator means; wherein said downstream section of said progressive flow reactor is surrounded by said upstream section of said overlapping conduit so as to provide a vapor pathway which is an annular space defined by exterior surfaces of said progressive flow reactor and interior surfaces of said upstream section of said overlapping conduit; wherein said vapor pathway is upstream of and spaced from said take-off conduit, wherein said take-off conduit is downstream of said axial opening; and wherein the length in direction of flow within said annular space is in the range of about ¼ to about three times the equivalent diameter of said take-off conduit.

14. The improved apparatus of claim 13, wherein the ratio of the cross-sectional flow area within said takeoff conduit to the cross-sectional area of said vapor pathway upstream of said takeoff conduit is in the range of 4:1 to about 8:1.

15. The improved apparatus of claim 14, wherein the ratio of the cross-sectional flow area within said takeoff conduit to the cross-sectional of said vapor pathway is in the range of about 5:1 to about 7:1.

16. An apparatus for the separation of solid particles suspended in the gaseous medium which comprises in combination: a progressive flow reactor having means defining a downstream section having an axial opening therein; a partially overlapping conduit having means defining an open upstream section of larger diameter than said progressive flow reactor, means defining an open downstream section, and a vapor takeoff conduit between said upstream and downstream sections adapted for connection to a separator means; wherein said downstream section of said progressive flow reactor is surrounded by said upstream section of said overlapping conduit so as to provide a vapor pathway which is an annular space defined by exterior surfaces of said progressive flow reactor and interior surfaces of said upstream section said overlapping conduit; wherein said vapor pathway is upstream of and spaced from said take-off conduit, wherein said take-off conduit is downstream of said axial opening; and wherein the ratio of the cross-sectional flow area of said take-off conduit to area of said axial opening in said progressive flow reactor is in the range of about ½:1 to about 1.5:1.

* * * * *